United States Patent
Baranowski et al.

(10) Patent No.: US 9,066,627 B2
(45) Date of Patent: Jun. 30, 2015

(54) SYSTEMS AND METHODS FOR INSTANT FOOD PREPARATION

(71) Applicant: Campbell Soup Company, Camden, NJ (US)

(72) Inventors: John Baranowski, Bensalem, PA (US); Talia Salamon-Hickey, Marlton, NJ (US); Susan Marie Caime, Tallahassee, FL (US); William John Cramer, Comberton (GB); John Allen Sinclair, Cambridge (GB); Michael Roy Fairs, St. Neots (GB)

(73) Assignee: CAMPBELL SOUP COMPANY, Camden, NJ (US)

( * ) Notice: Subject to any disclaimer, the term of this patent is extended or adjusted under 35 U.S.C. 154(b) by 0 days.

(21) Appl. No.: 13/851,652

(22) Filed: Mar. 27, 2013

(65) Prior Publication Data

US 2014/0113048 A1    Apr. 24, 2014

Related U.S. Application Data

(60) Provisional application No. 61/615,996, filed on Mar. 27, 2012.

(51) Int. Cl.
*A47J 43/04* (2006.01)
*A47J 43/044* (2006.01)
(Continued)

(52) U.S. Cl.
CPC ............ *A47J 43/044* (2013.01); *A23L 1/40* (2013.01); *A23L 2/39* (2013.01); *A47J 43/0711* (2013.01); *A23L 1/0008* (2013.01); *A23L 1/0035* (2013.01); *A47J 31/402* (2013.01); *A47J 31/404* (2013.01)

(58) Field of Classification Search
CPC ......... A23L 1/0008; A23L 2/52; A23L 1/187; A23L 1/39; A23L 1/40; A47J 43/044; A47J 43/046; A47J 43/0711; A47J 31/401–31/404
USPC .................. 426/519, 564–572, 588–599, 506
See application file for complete search history.

(56) References Cited

U.S. PATENT DOCUMENTS

| 2,637,537 A | * | 5/1953 | Ernst ............................ 416/185 |
| 2,832,575 A | | 4/1958 | Cirone |

(Continued)

FOREIGN PATENT DOCUMENTS

EP    1502643    2/2005

OTHER PUBLICATIONS

Easy Peasy Low-Fat Creamy Fruit Smoothie, Anu, Jun. 3, 2002, www.food.com/30262.*

(Continued)

*Primary Examiner* — Drew Becker
(74) *Attorney, Agent, or Firm* — Pauly, DeVries Smith & Deffner, LLC

(57) ABSTRACT

Embodiments of the invention include instant food systems and methods regarding the same. In an embodiment, the invention includes a method for preparing a hot instant food product. The method can include adding a heated liquid to a container, adding a substantially dry food product mixture to the container, wherein the volume of the dry food product mixture is equal to at least 20% of the volume of heated liquid, placing a mixing head into the container, and rotating the mixing head for a period of less than sixty seconds in order to form a fully hydrated frothed food product. In an embodiment, an instant food preparation machine is included. In an embodiment, a mixing head is included. In an embodiment, an instant food preparation kit is included. Other embodiments are also included herein.

7 Claims, 13 Drawing Sheets

(51) Int. Cl.
*A23L 1/40* (2006.01)
*A23L 2/39* (2006.01)
*A47J 43/07* (2006.01)
*A23L 1/00* (2006.01)
*A47J 31/40* (2006.01)

(56) References Cited

U.S. PATENT DOCUMENTS

| | | | |
|---|---|---|---|
| 2,833,576 | A | 5/1958 | Cirone |
| 4,361,176 | A | 11/1982 | West |
| 4,480,926 | A * | 11/1984 | Lattery et al. ................ 366/251 |
| 4,557,938 | A | 12/1985 | Sander et al. |
| 4,900,159 | A | 2/1990 | Jamison |
| 4,993,593 | A | 2/1991 | Fabiano et al. |
| 5,409,313 | A | 4/1995 | Funk |
| 5,538,749 | A | 7/1996 | Shimp |
| 5,570,955 | A | 11/1996 | Swartwout et al. |
| 5,599,103 | A | 2/1997 | Linscott |
| 5,730,525 | A | 3/1998 | Browne |
| 6,241,472 | B1 | 6/2001 | Bosch et al. |
| 6,383,546 | B1 * | 5/2002 | Powrie et al. ................ 426/599 |
| 6,585,404 | B2 | 7/2003 | Barton et al. |
| 6,729,753 | B2 | 5/2004 | Artman et al. |
| 7,052,172 | B2 | 5/2006 | Jahn et al. |
| 7,152,756 | B2 | 12/2006 | Baranowski |
| 7,226,631 | B2 * | 6/2007 | Thakur et al. ................ 426/477 |
| 7,270,156 | B2 * | 9/2007 | Beesley et al. ................ 141/82 |
| 7,497,352 | B2 | 3/2009 | Segiet et al. |
| 7,520,662 | B2 | 4/2009 | Farrell |
| 7,537,138 | B2 | 5/2009 | Saggin et al. |
| 7,669,517 | B2 * | 3/2010 | Boussemart et al. ........... 99/287 |
| 2002/0106435 | A1 | 8/2002 | Fish et al. |
| 2004/0156971 | A1 * | 8/2004 | Wuersch et al. ................ 426/591 |
| 2006/0003059 | A1 * | 1/2006 | Tabora ......................... 426/231 |
| 2007/0042090 | A1 * | 2/2007 | Mattson et al. ................ 426/120 |
| 2007/0109913 | A1 * | 5/2007 | McGill ........................ 366/205 |
| 2008/0008806 | A1 * | 1/2008 | Boussemart et al. .......... 426/519 |
| 2009/0129199 | A1 * | 5/2009 | Chang et al. .................. 366/148 |
| 2009/0130280 | A1 * | 5/2009 | Crow et al. ................... 426/519 |
| 2009/0186141 | A1 * | 7/2009 | Almblad et al. ............... 426/590 |
| 2010/0189857 | A1 * | 7/2010 | Blijdenstein et al. ......... 426/329 |
| 2011/0293807 | A1 * | 12/2011 | Dushine et al. ............... 426/519 |

OTHER PUBLICATIONS

Perfect Smoothie, Feb. 19, 2011, www.perfectsmoothie.com/how-to-make-a-smoothie.*

Effect of the particle size of spray-dried milk powder on some properties of chocolate, Keogh et al, 2004.*

International Search Report and Written Opinion, for PCT/US2013/034142, mailed Jan. 8, 2014 (17 pages).

International Preliminary Report on Patentability, for PCT/US2013/034142, mailed Oct. 9, 2014 (12 pages).

"BenchMix Programmable High Shear Lab Mixers and Pilot Plant", Admix, Inc. (2011), 1 page.

"Elian Food Starch", Avebe Food, Application Information, Oct. 1, 2007 (2 pages).

"Rotosolver—High Shear Dispersers and Dissolvers", Admix, Inc. (2011), 1 page.

Hoefler, Andrew C., "Sodium Carboxymethyl Cellulose, Chemistry, Functionality, and Applications", http://www.herc.com/foodgums/index.htm, 15 pages.

* cited by examiner

SYSTEMS AND METHODS FOR INSTANT FOOD PREPARATION

This application claims the benefit of U.S. Provisional Application No. 61/615,996, filed Mar. 27, 2012, the content of which is herein incorporated by reference in its entirety.

FIELD OF THE INVENTION

The present invention relates to instant food systems, components thereof, and methods regarding the same.

BACKGROUND OF THE INVENTION

Food products that can be quickly prepared for serving with a minimum of effort (instant food product) have become popular in various settings including the home, cafeterias, and restaurants. Instant food products are quite varied and can include items served hot, cold, or at room temperature. Some instant food products are kept frozen and then thawed and/or cooked prior to serving. Others are shelf stable at room temperature by virtue of their packaging and/or the use of preservatives and relatively little needs to be done before serving them. Still others are provided in a dehydrated format and either consumed in a dehydrated condition or they are hydrated before serving.

While instant food products have found success because of their convenience, not all instant food products have achieved high marks for organoleptic properties. As such, improvement of the organoleptic properties of instant food products has been an area of continued work.

SUMMARY OF THE INVENTION

Embodiments of the invention include instant food systems and methods regarding the same. In an embodiment, the invention includes a method for preparing a hot instant food product. The method can include adding a heated liquid to a container, adding a substantially dry food product mixture to the container, wherein the volume of the dry food product mixture is equal to at least 20% of the volume of heated liquid, placing a mixing head into the container, and rotating the mixing head for a period of less than sixty seconds in order to form a fully hydrated frothed food product.

In an embodiment, the invention includes a method for preparing an unheated instant food product. The method can include adding a cold liquid to a container, adding a substantially dry food product mixture to the container, wherein the volume of the dry food product mixture is equal to at least 20% of the volume of the cold liquid, placing a mixing head into the container, and rotating the mixing head for a period of less than sixty seconds in order to form a fully hydrated food product.

In an embodiment, the invention includes an instant food preparation machine. The machine can include a drive shaft, the drive shaft configured to move between a raised position and a lowered position, a first electric motor operably connected to the drive shaft to raise and lower the drive shaft, a second electric motor operably connected to the drive shaft to rotate the drive shaft at speeds between 200 and 2000 rotations per minute, a mixing head, the mixing head configured to engage the drive shaft, and a controller module configured to control operation of the first electric motor and the second electric motor.

In an embodiment, the invention can include a mixing head for an instant food preparation machine. The mixing head can include a polymeric head with one or more mixing fins, a cover connected to the polymeric head, the cover having a diameter larger than the polymeric head and sufficient to prevent materials from exiting a container into which the polymeric head is inserted, and a drive shaft engagement interface configured to pair the mixing head with a draft shaft.

In an embodiment, the invention can include an instant food preparation kit. The kit can include a mixing head assembly, a dry food packet defining an interior volume, and a dry food product disposed within the interior volume of the dry food packet.

In an embodiment, the invention includes a high shear mixing head. The high shear mixing head can include an annular mixing blade, a central hub, a first strut, and a second strut. The annular mixing blade can include a plurality of flat portions and a plurality of humps. The plurality of humps can rise above the plurality of flat portions.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

Specific food textures and mouth feel can be difficult to replicate in the format of an instant food product when starting from a dry food product mixture. For example, it is difficult to achieve a sufficiently creamy soup texture starting with a dehydrated product. This is particularly difficult to achieve where the time allocated to preparation of the food is relatively short. However, various embodiments herein can be used in order to meet specific texture and mouth feel requirements while minimizing food preparation time.

In addition, various embodiments herein can be used to minimize and/or eliminate the presence of unhydrated masses within the food product. The term "fisheye" as used herein shall refer to an undesirable semi-solid lump or undissolved mass of a powdered food product with a wetted exterior and a substantially dry interior that is difficult to break up and dissolve because it is substantially structurally stable and liquid cannot penetrate into the dry interior. Fisheyes can form readily with many dry powdered materials, but especially problematic with gums, thickening agents, and starches. In the context of instant food products that involve hydration of a dehydrated food product, fisheyes can form at the interface between the liquid and the dehydrated product itself and can be extremely difficult, if not impossible, to break up using manual agitation.

It has been observed that issues associated with obtaining a desirable food texture, mouth feel, and the formation of fisheyes is related to the amount of dry food product material used for a food product in comparison to the amount of liquid used. In general, the greater the amount of solid material used to form the food product the greater the challenge associated with obtaining the proper food texture, mouth feel and lack of fisheyes. Embodiments herein can be used to prepare food products having desirable textures, mouth feel, and lack of fisheyes even in the context of food products having high amounts of solid material.

Figure 1:
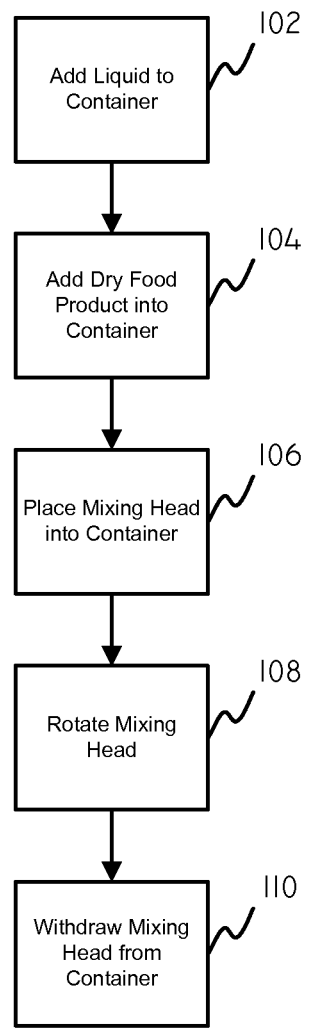
FIG. 1 is a flow chart of a process in accordance with various embodiments herein.

Referring now to FIG. 1, a flow chart is shown of a process in accordance with various embodiments herein. In a first operation 102, a liquid can be added to a food product container. In some embodiments, the liquid can be hot. By way of example, in some embodiments, the liquid can be at least about 140 degrees Fahrenheit. In some embodiments, the liquid can be at least about 165 degrees Fahrenheit. In some embodiments, the liquid can be relatively cold. By way of example, in some embodiments, the liquid can be less than about 100 degrees. In some embodiments, the liquid can be less than about 75 degrees. In some embodiments, the liquid can be less than about 45 degrees. Many different types of liquids can be used. By way of example, liquids can include, but are not limited to, water, milk, cream, stock, broth, and the like. The amount of liquid added can depend on the type of food product being prepared, as well as the serving size being prepared. However, in some embodiments, an amount of liquid between 50 ml and 1000 ml can be added. The liquid can be added either manually or automatically.

Although FIG. 1 shows that liquid is added to the food product container first, it will be appreciated that in various embodiments the liquid can be added after the dry food product or can be added simultaneously with the dry food product.

The food product container itself can take on many different forms. In some embodiments, the food product container can have a volume sufficient to hold between about 2 to 60 ounces of a prepared food product. In some embodiments, the food product container is in the form of a cup or a bowl. The food product container can be made from various materials including, but not limited to, cellulosic materials (e.g., paper), polymeric materials, foils, and the like.

In a second operation 104, a dry food product can be added into the container. By way of example, the dry food product can be added on top of the liquid within the food product container. The dry food product can be suitable for various types of instant foods. Descriptions of exemplary instant food types are provided in greater detail below. The amount of the dry food product added in comparison to the amount of liquid in the food product container can be quite substantial. By way of example, as measured by volume, the dry food product mixture can be equal to at least about 20% of the volume of the liquid. By way of example, as measured by volume, the dry food product mixture can be equal to at least about 30% of the volume of the liquid. In some embodiments, the dry food product mixture can be equal to at least about 40% of the volume of the liquid. In some embodiments, the dry food product mixture can be equal to at least about 50% of the volume of the liquid. The dry food product can be added either manually or automatically. In some embodiments, about 8 ounces of a liquid are added and about 2 ounces of a powdered food product are added.

In a third operation 106, a mixing head, such as a high-shear mixing head, can be placed into the container. Examples of mixing heads are provided in greater detail below. In some embodiments, the mixing head can be placed in the container automatically. For example, the instant food preparation system can automatically lower the mixing head into the container. In some embodiments, a sensor can be incorporated into the system to detect the presence of a food product container in the proper position underneath the mixing head and can prevent lowering of the mixing head if the container is not present.

In a fourth operation 108, the mixing head can be rotated in order to mix the dry food product with the liquid in the food product container thereby forming a fully hydrated food product. The mixing head can be rotated for various periods of time. In some embodiments, the mixing head can be rotated until the hydrated food product has a substantially uniform consistency. In some embodiments, the resulting hydrated food product has substantially no unhydrated portions. In some embodiments, the mixing head can be rotated until there are substantially no remaining lumps of the dry food product or fisheyes present within the food product container. In some embodiments, the resulting hydrated food product has no fisheyes having a diameter of greater than 1 mm.

In some embodiments, the mixing head can be rotated for at least about 10 seconds. In some embodiments, the mixing head can be rotated for at least about 20 seconds. In some embodiments, the mixing head can be rotated for at least about 30 seconds. In some embodiments, the mixing head can be rotated for at least about 45 seconds. In some embodiments, the mixing head can be rotated for at least about 60 seconds. In some embodiments, the mixing head can be rotated for at least about 90 seconds.

It will be appreciated, however, that it can be unacceptable in some food preparation settings if it takes a substantial amount of time in order to eliminate lumps or fisheyes. In some embodiments, the mixing head can be rotated for less than about 5 minutes. In some embodiments, the mixing head can be rotated for less than about 2 minutes. In some embodiments, the mixing head can be rotated for less than about 1 minute. In some embodiments, the mixing head is rotated for between 20 seconds and 90 seconds. In some embodiments, the mixing head is rotated for between 30 seconds and 60 seconds. In some embodiments, the mixing head is rotated for about 20 seconds.

The mixing head can be rotated at varying speeds depending on various factors including the degree of shear necessary to attain for preparation of the particular food product, the temperature of the liquid, the design of the particular mixing head, etc. In some embodiments, the mixing head can be rotated at a speed of between 10 and 10,000 rotations per minute (RPM). In some embodiments, the mixing head can be rotated at a speed of between 2,000 and 6,000 rotations per minute (RPM). In some embodiments, the mixing head can be rotated at a speed of between 3,000 and 5,000 rotations per minute (RPM). In some embodiments, the mixing head can be rotated at a speed of between 10 and 1200 rotations per minute (RPM). In some embodiments, the mixing head can be rotated at between 100 and 1000 RPM. In some embodiments, the mixing head can be rotated at between 300 and 700 RPM. In some embodiments, the mixing head can be rotated at a speed of at least 200 RPM.

In addition to, or instead of, rotating the mixing head, movement of the mixing head can include vibration, lateral motion, sweeping motions, circular movement, and the like.

Movement of the mixing head can result in incorporation of a substantial amount of air into the food product. By way of example, in some embodiments, the hydrated food product can include at least about 5% air by volume. In some embodiments, the hydrated food product can include at least about 10% air by volume. In some embodiments, the hydrated food product can include between about 2% and 15% air by volume. In some embodiments, the air can be stably incorporated for at least about 15 seconds. In some embodiments, the air can be stably incorporated for at least about 30 seconds. In some embodiments, the air can be stably incorporated for at least about 60 seconds.

In some embodiments, movement of the mixing head can be used to incorporate air into the product in order to create a semi-stable froth out of the hydrated food product. By way of example, in some embodiments, the mixing head can be used to form a semi-stable froth without the need for a separate air supply to inject air directly into the food product. In some embodiments, the froth can be stable for at least about 15 seconds. In some embodiments, the froth can be stable for at least about 30 seconds. In some embodiments, the froth can be stable for at least about 60 seconds.

In some embodiments, the fully hydrated food product can have relatively viscous characteristics consistent with the particular type of instant food being prepared. In some embodiments, the fully hydrated food product can have a Bostwick consistometer value of between 3 cm and 30 cm. In some embodiments, the fully hydrated food product can have a Bostwick consistometer value of between 3 cm and 15 cm. In some embodiments, the system can create a food product with these Bostwick characteristics within less than 60 seconds of the beginning of rotation of the mixing head. In some embodiments, the system can create a food product with these Bostwick characteristics within less than 30 seconds of the beginning of rotation of the mixing head. In some embodiments, the system can create a food product with these Bostwick characteristics within less than 20 seconds of the beginning of rotation of the mixing head.

In some embodiments, the fully hydrated food product can have a relatively high amount of solids content. By way of example, in some embodiments, the hydrated food product can have at least about 10% solids by weight. In some embodiments, the hydrated food product can have at least about 20% solids by weight. In some embodiments, the hydrated food product can have at least about 30% solids by weight. In some embodiments, the hydrated food product can have at least about 40% solids by weight.

In a fifth operation 110, the mixing head can be withdrawn from the food product container. In some embodiments, the mixing head can be withdrawn from the food product container automatically after the mixing head finishes rotation or at least substantially slows down. In some embodiments, such as where the mixing head is disposable, the mixing head can simply be discarded after a single use. In other embodiments, the mixing head can be designed for reuse and can be cleaned after use.

It will be appreciated that in some embodiments various additional steps can be performed in addition to, or instead of, those in FIG. 1. In some embodiments, additional components can be added to the hydrated food product after the mixing head rotates. By way of example, food components such as garnishes, larger solid particulate materials, cracker crumbs, small baked components, and the like can be added (manually or otherwise) to the hydrated food product and then either mixed in manually or simply left on top of the hydrated food product.

Figure 2:
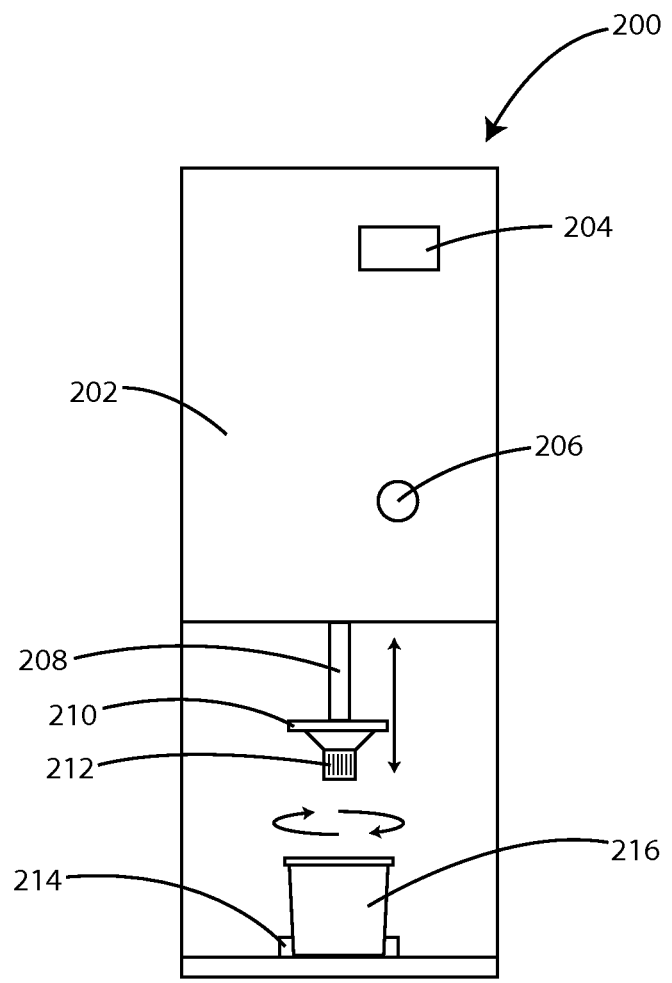
FIG. 2 is a schematic diagram of an instant food preparation system in accordance with various embodiments herein.

Referring now to FIG. 2, a schematic diagram of an instant food preparation system 200 in accordance with various embodiments herein is shown. The instant food preparation system 200 can include a housing 202. A status display 204 can be mounted on the housing 202 in some embodiments to display information regarding the operational status of the instant food preparation system 200. In some embodiments, the system 200 can include a button 206 to start operations. The system 200 can include a drive shaft 208. The drive shaft 208 can rotate in either direction. The mixing head 212 can include a cover 210. In some embodiments, the cover 210 can be integral with the mixing head 212. In some embodiments, the cover 210 can be separate from the mixing head 212. The mixing head 212 can be mounted on the drive shaft 208. The mixing head 212 can move up and down vertically. In some embodiments the mixing head can also move horizontally. In operation, the mixing head 212 can be lowered into a food product container 216. In some embodiments, the mixing head 212 can be put into the system and then the system can automatically lower the mixing head 212 into the food product container 216. In some embodiments, a container alignment guide 214 can be attached to the system 200 in order to assist in placing the food product container 216 into the proper position.

Figure 3:
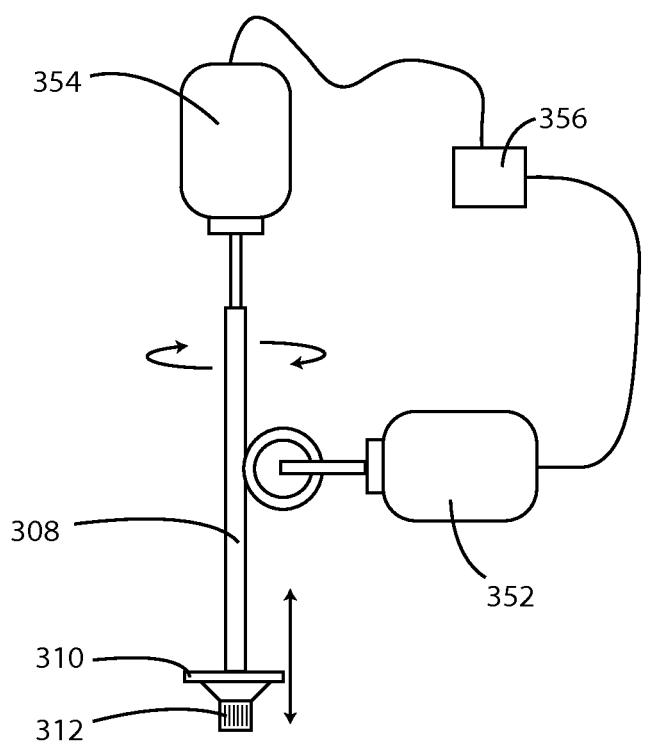
FIG. 3 is a schematic diagram of some components of an instant food preparation system in accordance with various embodiments herein.

While it will be appreciated that many different specific components can be used with a food preparation system in accordance with embodiments herein, FIG. 3 shows some components of such as system schematically. The system can include a first electric motor 352 in order to raise and lower the drive shaft 308. The system can further include a second electric motor 354 in order to rotate the drive shaft 308. The system can also include a controller module 356 that can be configured to control operation of the first electric motor 352 and the second electric motor 354. The controller module 356 can include, in various embodiments, a microprocessor, a programmable microcontroller, or the like. Various sensors (not shown) can be connected to the controller module 356. In various embodiments, the controller module 356 can be used to control elements other than, or in addition to, the electric motors. The drive shaft 308 can be operably connected to the mixing head 312 and the cover 310.

Figure 4:
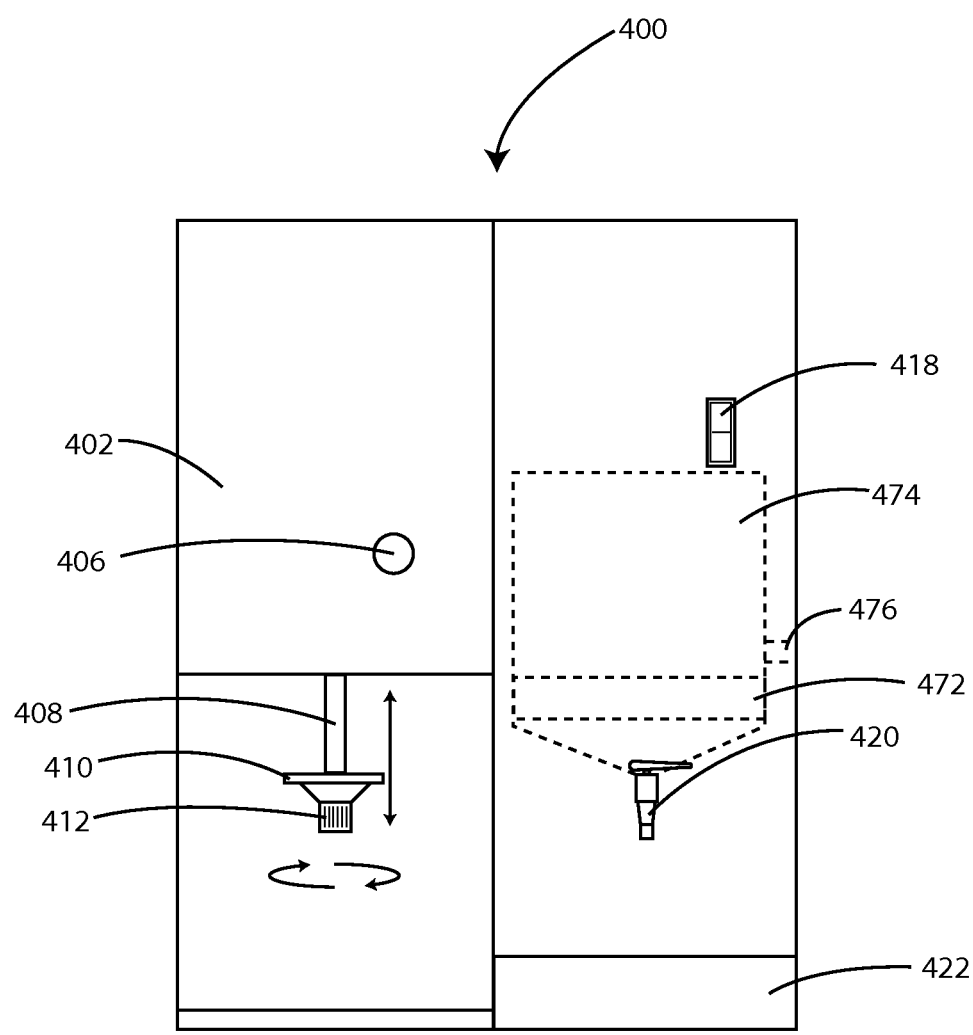
FIG. 4 is a schematic diagram of another instant food preparation system in accordance with various embodiments herein.

In some embodiments, food preparation systems can include other features that can aid in the preparation of instant food products. Referring now to FIG. 4, a schematic view of an instant food preparation system 400 is shown in accordance with another embodiment. The system 400 can include a housing 402, a button 406 to start operations of the system 400, a drive shaft 408, a mixing head 412 and mixing head cover 410. The mixing head 412 can be mounted on the drive shaft 408. The system 400 can further include a liquid dispensing orifice 420, a liquid storage vessel 474, a heating element 472, and a liquid input line 476. The heating element 472 can be used to heat liquid in the liquid storage vessel 474. The system 400 can also include a dispensing platform 422 that can be used to hold a container as liquid is put into it. In some embodiments, the dispensing platform 422 can also be used to catch any extra liquid that might spill. The system 400 can also include a power switch 418 in some embodiments. In some embodiments, the system can include a dry food product dispenser (not shown) in order to automatically dispense the dry food product into the container.

Figure 5:
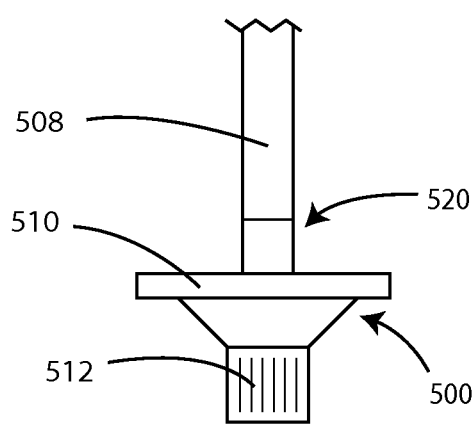
FIG. 5 is a schematic diagram of a mixing head assembly in accordance with an embodiment of the invention.

Referring now to FIG. 5, a schematic diagram of a mixing head assembly 500 is shown in accordance with an embodiment of the invention. The mixing head assembly 500 can include a mixing head 512 and a cover 510. In some embodiments, the cover 510 can be an integrated cover. The cover 510 can have a diameter sufficient to cover a food product container that is used with the system. In this particular embodiment, the mixing head assembly 500 can be detachable from the drive shaft 508. The mixing head assembly 500 can be operably connected to the drive shaft at an interface 520 (or drive shaft engagement interface).

The mixing head 512 and the cover 510 can be made from many different types of materials. By way of example, in some embodiments, the mixing head 512 and/or the cover are made from a polymeric material. In some embodiments, the mixing head 512 and/or the cover 510 are made from a biodegradable polymer. In some embodiments, the mixing head 512 and/or the cover 510 are made from a metal, such as stainless steel. In still other embodiments, the mixing head 512 and/or the cover 510 are made from a ceramic.

Figure 6:
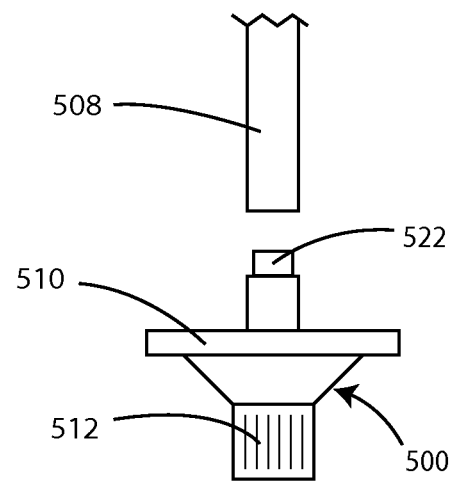
FIG. 6 is a schematic diagram of the mixing head assembly of FIG. 5 detached from the drive shaft.

FIG. 6 is a schematic diagram of the mixing head assembly of FIG. 5 shown removed from the drive shaft 508. The mixing head assembly 500 can include an attachment point 522 that can be used in securing it to the drive shaft 508. In some embodiments, the mixing head assembly 500 can be attached to the drive shaft 508 through a simple compression-fit mechanism. In other embodiments, the mixing head assembly 500 can be attached through a tongue and slot type mechanism, a threaded portion, magnetically, or the like.

It will be appreciated that system components herein can be integrated into a vending machine in some embodiments.

Instant Food Types

Instant food types that can be used in conjunction with embodiments herein can include, but are not limited to, food products that are prepared as hot foods, room temperature foods, and/or cold foods. Hot food types can include, without limitation, soups (including cream or broth type soups), drinks, confections, desserts, cereals, oatmeal, nutritional supplements, nutraceuticals, and the like. Room temperature and/or cold food types can include, without limitation, soups (including cream or broth type soups), drinks, yogurt products, other dairy based products, smoothies, confections, desserts, cereals, oatmeal, nutritional supplements, nutraceuticals, and the like. In some particular embodiments, the instant food type is a soup. In some particular embodiments, the instant food type is a cream-based soup. In some particular embodiments, the instant food type is a broth-based soup.

Specific ingredients used with the dry food product for the instant foods can vary based on the type of instant food. Ingredients (in substantially dried forms) can include, but are not limited to, various vegetables such as potatoes, tomatoes, onions, parsley, peas, squash, cabbage, carrots, celery, onion, leeks, spinach, zucchini, broccoli, peppers, chilies, garlic, beans, barley and corn, various fruits, and other components such as chicken, chicken stock, chicken fat, chicken broth, beef, beef stock, beef fat, beef broth, ham, ham stock, clams, clam stock, clam extract, crab meat, milk, cream, butter, cheese, yogurt, mushrooms, various types of nuts, lemon juice, lime juice, sucrose, fructose, dextrose, sea salt, sodium chloride, potassium chloride, calcium chloride, zinc chloride, potassium phosphate, sodium phosphate, soy protein, soy sauce, cellulose gum, cellulose gel, maltodextrin, potato starch, corn starch, modified starch, locust bean gum, xanthan gum, wheat flour, wheat, rice, oats, various other grains, acetic acid, ascorbic acid, lactic acid, malic acid, vegetable oil, and various seasonings and/or spices such as basil, bay leaves, cilantro, cumin, fennel seed, nutmeg, marjoram, oregano, rosemary, thyme, pepper, and Worcestershire sauce, amongst others.

In some embodiments, the ingredients in the dry food product can be powdered. By way of example, the ingredients can be in a very small particulate format in order to maximize wetting surface. In some embodiments, the particles can all pass through a #70 mesh sieve (having a nominal sieve opening size of 210 microns). As such, in some embodiments, the particles have a diameter of less than 210 microns.

However, in other embodiments, the ingredients in the dry food product can have larger particle sizes. By way of example, cereals can have larger particle sizes. As such, in some embodiments, the particles have a diameter of less than 10 millimeters.

Food Product Kit

Figure 7:
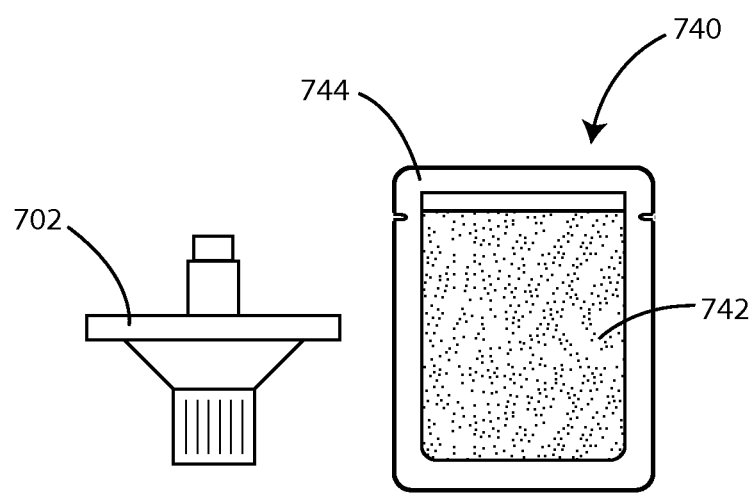
FIG. 7 is a schematic diagram of some components of a kit in accordance with various embodiments herein.

In various embodiments, a food product kit is included. Referring now to FIG. 7, a schematic diagram of some components of a kit in accordance with various embodiments herein is shown. The kit can include a mixing head assembly 702 and a dry food packet 740. The dry food packet 740 can include packaging 744 defining an interior volume for holding a dry food product 742. In some embodiments, the kit can also include a secondary packet (not shown) including components to be added to the food product after the contents of the dry food packet 740 are fully mixed with a liquid. By way of example, a secondary packet can include food components that are added to the rest of the food product after the mixing head completes rotation and then mixed in manually. In some embodiments, a secondary packet can include components that are kept separately from the dry food packet 740 for optimal retention of organoleptic properties and may be added prior to rotation of the mixing head. In some embodiments, the kit can also include a food product container (not shown).

Exemplary Mixing Heads

Figure 8:
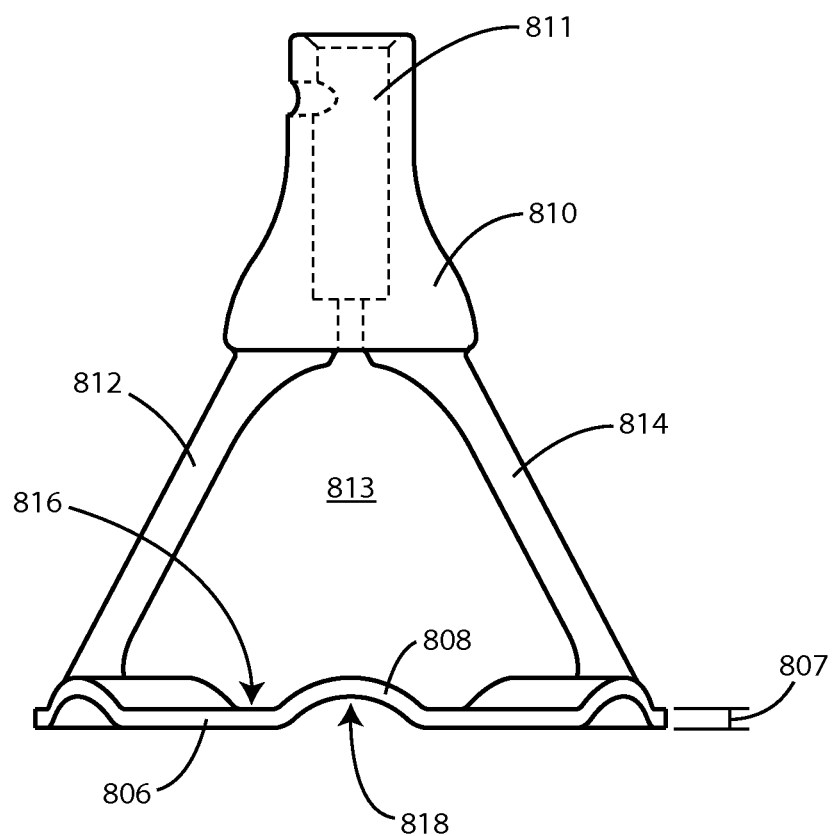
FIG. 8 is an elevational view of a high shear mixing head in accordance with various embodiments herein.

FIG. 8 is an elevational view of a high shear mixing head in accordance with various embodiments herein. The high shear mixing head 802 includes an annular mixing blade 804, a central hub 810, a first strut 812, and a second strut 814. In between the first strut 812 and the second strut 814 is an open area 813. The annular mixing blade 804 includes a plurality of flat portions 806 and a plurality of humps 808. The annular mixing blade 804 has a vertical thickness 807 that can range from 0.5 mm to 5 mm in some embodiments. In other embodiments, the vertical thickness 807 can be outside that range.

The plurality of flat portions 806 each have a top surface 816. The plurality of flat portions 806 each have a bottom surface 818. The plurality of humps 808 can rise above the plurality of flat portions. In some embodiments, the humps 808 can be sufficiently large such that the bottom surface 818 of the humps is higher than the top surface 816 of the flat portions 806. The bottom surface 818 can have an apex (e.g., highest point on the bottom surface). In some embodiments, the bottom surface 818 of the plurality of humps 808 at the apex are higher than the top surface 816 of the plurality of flat portions 806.

Figure 9:
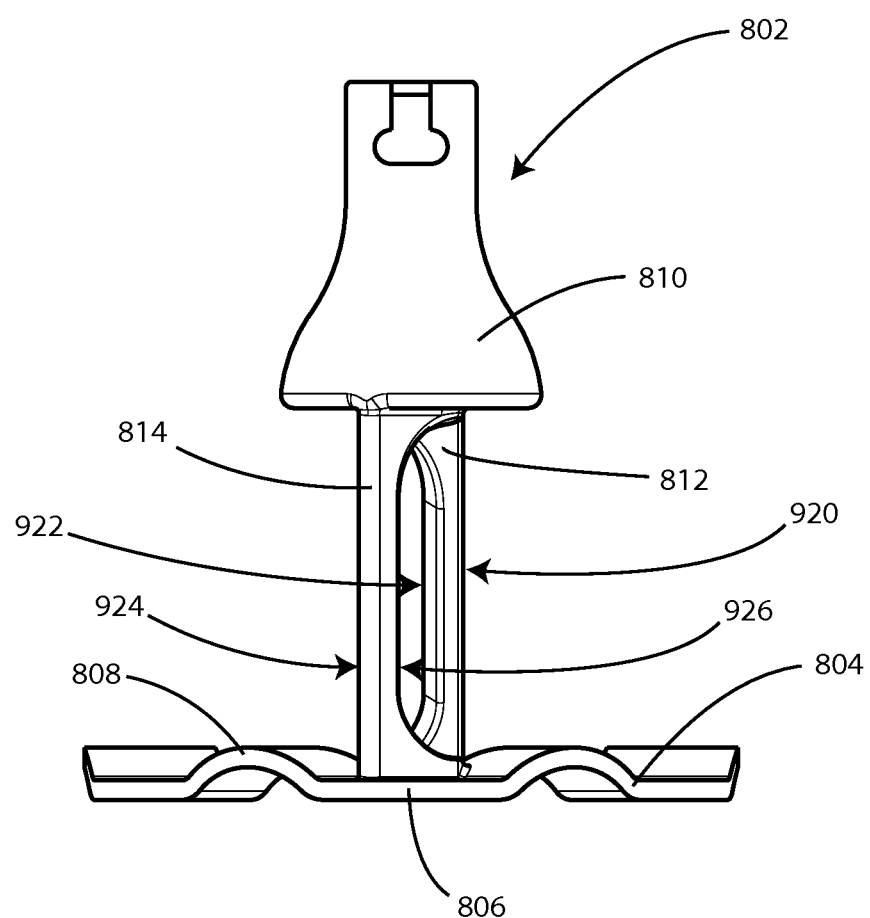
FIG. 9 is an elevational view of the high shear mixing head of FIG. 8 as viewed from a different angle.

FIG. 9 is an elevational view of the high shear mixing head of FIG. 8 as viewed from a different angle. As before, the high shear mixing head 802 includes an annular mixing blade 804, a central hub 810, a first strut 812, and a second strut 814. The first strut 812 has a leading edge 920. The leading edge 920 is substantially straight. The first strut 812 also has a trailing edge 922. The trailing edge 922 can be shaped differently than the leading edge. The second strut 814 also has a leading edge 924. The leading edge 924 is substantially straight. The second strut 814 also has a trailing edge 926.

Figure 10:
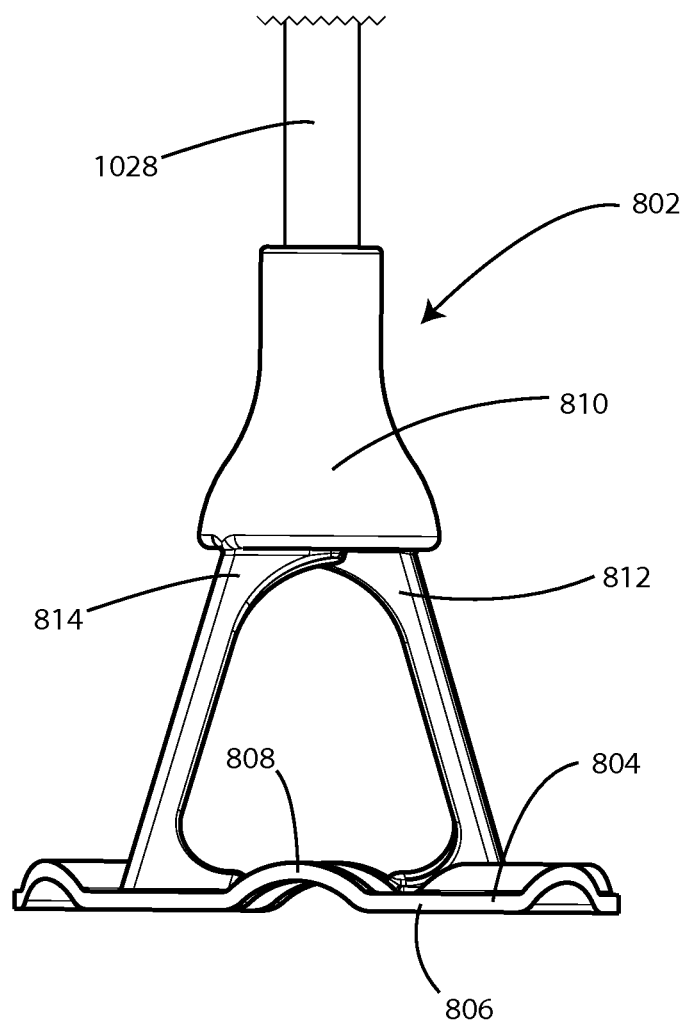
FIG. 10 is an elevational view of the high shear mixing head of FIG. 8 as viewed from a different angle.

FIG. 10 is an elevational view of the high shear mixing head of FIG. 8 as viewed from yet a different angle. As before, the high shear mixing head 802 includes an annular mixing blade 804, a central hub 810, a first strut 812, and a second strut 814. The annular mixing blade 804 includes a plurality of flat portions 806 and a plurality of humps 808. The high shear mixing head 802 comprising a shaft 1028.

Figure 11:
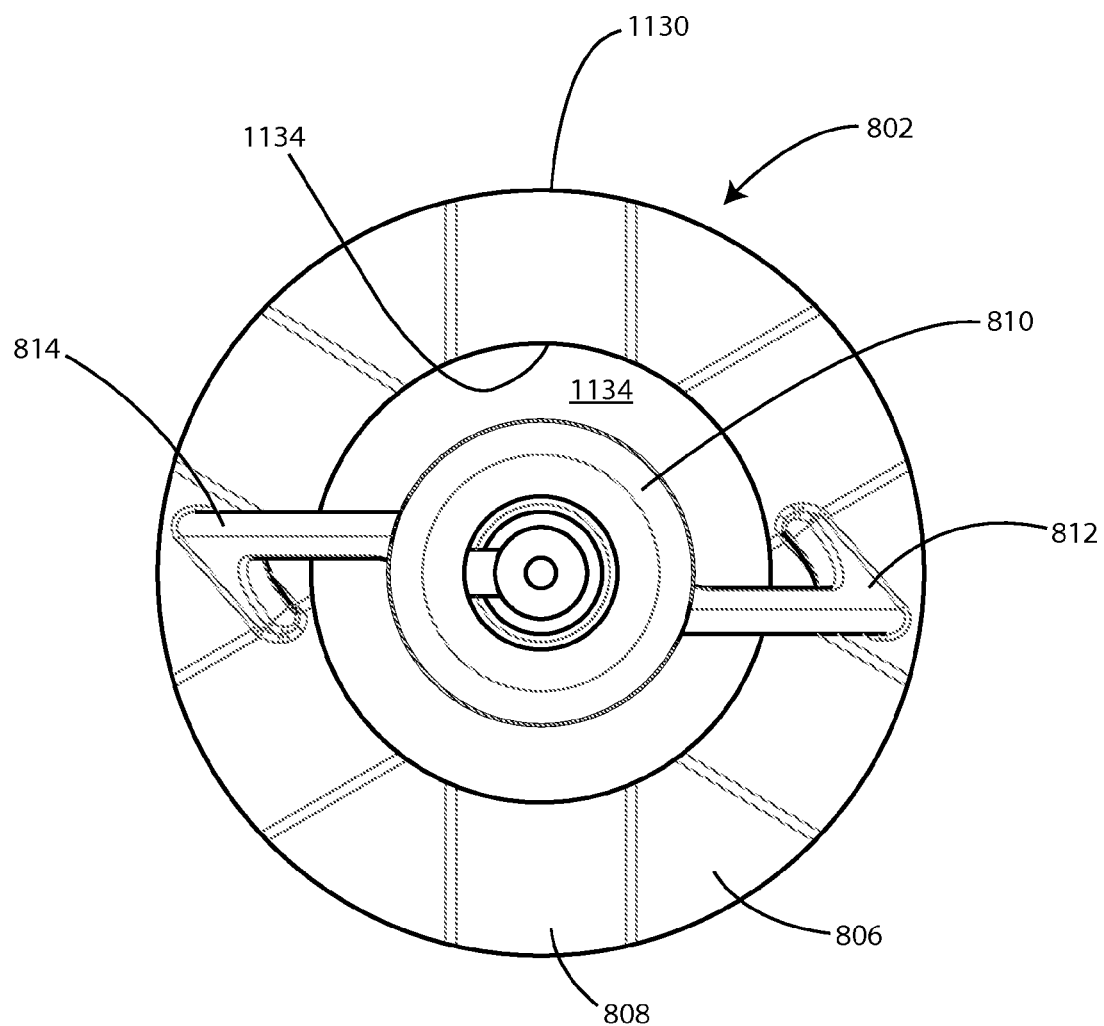
FIG. 11 is a top plan view of the high shear mixing head of FIG. 8 in accordance with various embodiments herein.

FIG. 11 is a top plan view of the high shear mixing head of FIG. 8 in accordance with various embodiments herein. As before, the high shear mixing head 802 includes an annular mixing blade 804, a central hub 810, a first strut 812, and a second strut 814. The annular mixing blade 804 includes a plurality of flat portions 806 and a plurality of humps 808. The annular mixing blade 804 has an outer perimeter 1130. In this embodiment, the outer perimeter 1130 forms an unbroken spherical shape when viewed from above. The annular mixing blade 804 also includes an inner perimeter 1134. The annular mixing blade 804 defines a central aperture 1136, bordered by the inner perimeter 1134.

Figure 12:
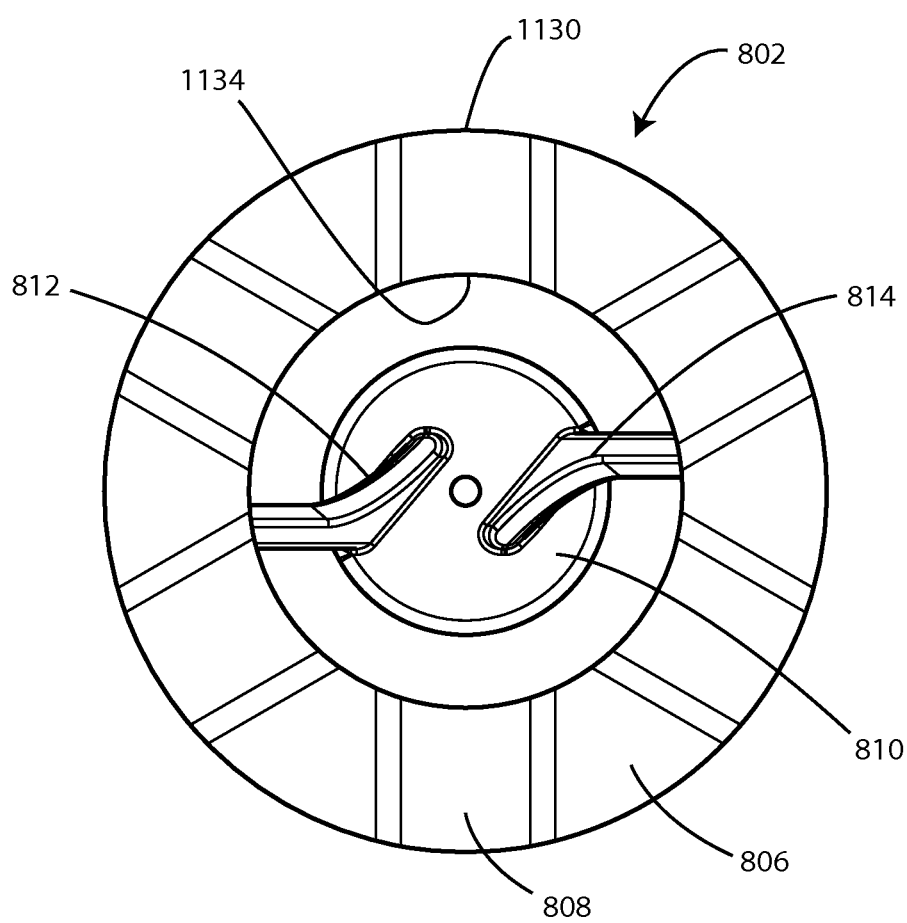
FIG. 12 is a bottom plan view of the high shear mixing head of FIG. 8 in accordance with various embodiments herein.

FIG. 12 is a bottom plan view of the high shear mixing head of FIG. 8 in accordance with various embodiments herein. As before, the high shear mixing head 802 includes an annular mixing blade 804, a central hub 810, a first strut 812, and a second strut 814. The annular mixing blade 804 includes a plurality of flat portions 806 and a plurality of humps 808. The annular mixing blade 804 includes an outer perimeter 1130 and an inner perimeter 1134.

It will be appreciated that many different materials can be used to form the high shear mixing head or portions thereof. In some embodiments, the high shear mixing head can be substantially durable and fit for repeated use. In other embodiments, the high shear mixing head can be disposable. In some embodiments, the high shear mixing head can be formed of a metal, a ceramic, a polymer, a composite, or the like.

As described, the high shear mixing head can include a plurality of flat portions. In some embodiments, the high shear mixing head can include from 2 to 12 flat portions. In some embodiments, the high shear mixing head can include from 4 to 8 flat portions. In some embodiments, the high shear mixing head can include 6 flat portions. The high shear mixing head can include a plurality of humps. In some embodiments, the high shear mixing head can include from 2 to 12 humps. In some embodiments, the high shear mixing head can include from 4 to 8 humps. In some embodiments, the high shear mixing head can include 6 humps.

The annular mixing blade can have a diameter of about 2 cm to about 12 cm. In some embodiments, the distance between the annular mixing blade and the central hub is about 1 cm to about 20 cm.

It will be appreciated that while the embodiments of high shear mixing heads shown in FIGS. 8-12 all have two struts, other numbers of struts are contemplated and included herein. By way of example, in various embodiments, high shear mixing heads can include from 1 to 8 struts.

The annular mixing blade defines a central aperture, bordered by the inner perimeter. In some embodiments, the central aperture is sufficient in size so as to cover at least about 60% of the area within the outer perimeter of the annular mixing blade. In some embodiments, the distance between the inner perimeter and the outer perimeter of the annular mixing blade is greater than the vertical thickness of the annular mixing blade.

In various embodiments, the high shear mixing head demonstrates unique properties. It is desirable if the high shear mixing head creates shear forces that are sufficiently large so as to break up fisheyes in a very short (<60 seconds) amount of time. However, it can be problematic if the high shear mixing head causes substantial movement of the liquid into which it is put because liquid flow will be deflected by the bottom and sides of the container and result in material being expelled from the container. Various embodiments of mixing heads herein can serve these two seemingly contradictory performance requirements. For example, in some embodiments, the high shear mixing head generates sufficient shear forces when it is spun at 4000 rpm so as to eliminate 95% of fisheyes in a composition including water and a substantially dry food product mixture (wherein the volume of the dry food product mixture is equal to at least 20% of the volume of heated liquid) after 60 seconds. In various embodiments, when the high shear mixing head is spun at 4000 rpm it generates movement of a liquid into which it is put that is sufficiently low so as to cause less than 5% of the liquid to expel from a container that is less than 5 inches wide and less than 4 inches tall after 60 seconds. In addition, embodiments of high shear mixing heads herein can result in substantial aeration of the resulting food product.

Figure 13:
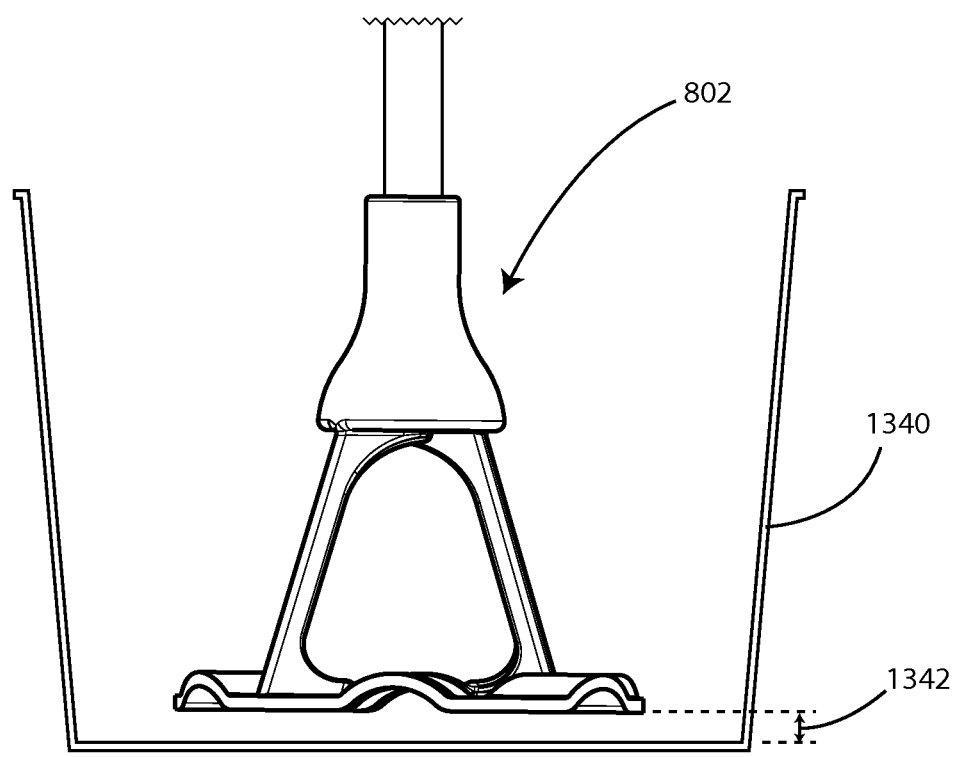
FIG. 13 is a schematic cut-away view showing a high shear mixing head inside of a container.

Referring now to FIG. 13, a schematic cut-away view is showing a high shear mixing head 802 inside of a container 1342. The container 1342 can have various dimensions. In some embodiments, the container 1342 has a width of greater than 2 inches. In some embodiments, the container 1342 has a width of greater than 3 inches. In some embodiments, the container 1342 has a width of less than 6 inches. In some embodiments, the container 1342 has a width of less than 5 inches. In some embodiments, the container 1342 has a height of greater than 2 inches. In some embodiments, the container 1342 has a height of greater than 3 inches. In some embodiments, the container 1342 has a height of less than 8 inches. In some embodiments, the container 1342 has a width of less than 6 inches. In this embodiment, the high shear mixing head 802 is separated from the bottom of the container by a distance 1342 of about ⅛ inch to about ¼ inch, though it will be appreciated that other separation distances can be used. Based on the relatively small size of the container and the high speeds of rotation of the high shear mixing head, it is remarkable that very little liquid is expelled from the container during operation.

Figure 14:
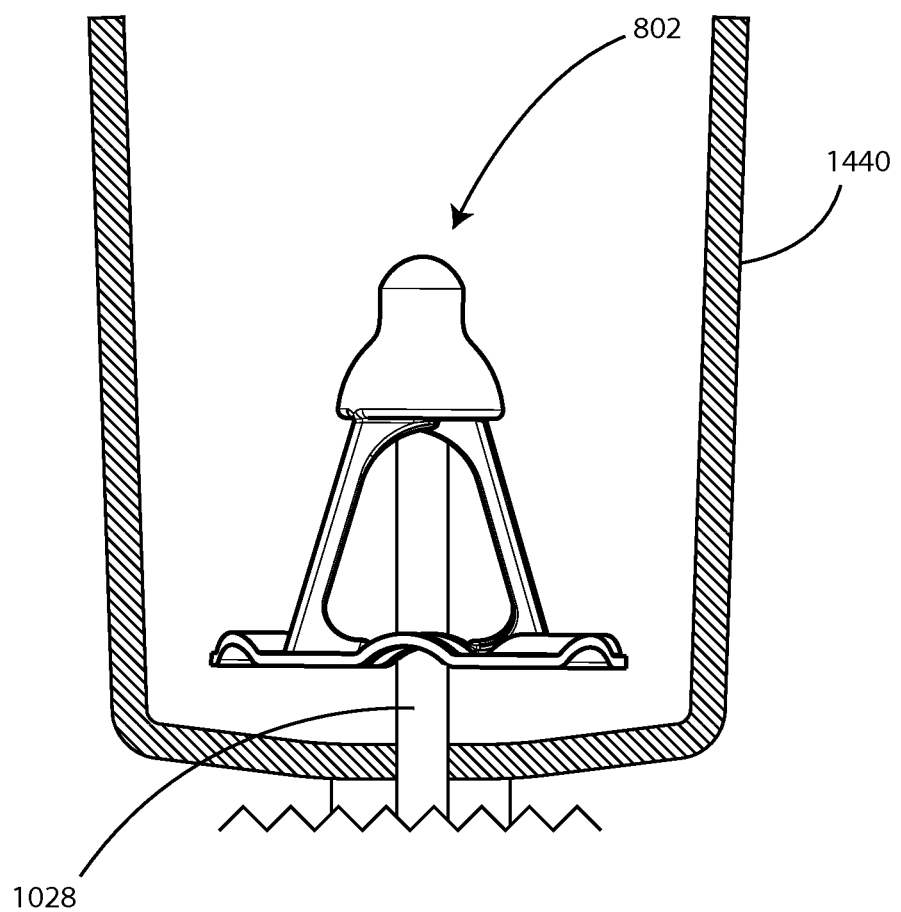
FIG. 14 is a schematic cut-away view showing a high shear mixing head inside of a blender housing.

It will be appreciated that high shear mixing heads can be used in conjunction with blenders and like mixing devices. Referring now to FIG. 14, a schematic cut-away view is shown of a high shear mixing head 802 (not to scale) inside of a blender housing 1440. In this embodiment, a shaft 1028 to drive the high shear mixing head 802 is disposed centrally. However, it will be appreciated that other configurations for conveying power to the high shear mixing head 802 are contemplated herein. For example, in some embodiments, multiple points of connection exist directly between the annular mixing blade and shaft.

Example 1

Preparation of Heated Instant Food Product

A test system was set up including a motor, drive shaft, and a mixing head similar to as shown in FIGS. 8-12. For purposes of comparison, a hand held milk frother (French Café Frother by BonJour) was obtained.

100 ml of water was heated to a temperature of 100 degrees Celsius. This hot water was then added to a cup having a total volume of approximately 100 ml. Approximately 19 grams of a dry soup mix containing roughly 15% by weight of starch was added on top of the hot water. The high shear mixing head of the test system was inserted into the hot water to a depth such that the bottom of the annular mixing blade was approximately 3/16 of an inch from the bottom of the container. The high shear mixing head was run at approximately 4000 rpm for 24 seconds. This procedure was then repeated with the hand held milk frother.

The instant food products were inspected for the presence of fisheyes. It was found that the instant food product prepared with the test system contained substantially no fisheyes. In contrast, the instant food product prepared with the hand held milk frother included a substantial number of fisheyes, estimated to be equal to at least about 1.25% of the mass of dry soup mix initially put into the container.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The invention has been described with reference to various specific and preferred embodiments and techniques. However, it should be understood that many variations and modifications may be made while remaining within the spirit and scope of the invention.

The invention claimed is:

1. A method for preparing an instant food product comprising:
    adding a liquid to a container;
    adding a substantially dry food product mixture to the container, wherein the volume of the dry food product mixture is equal to at least 20% of the volume of liquid;
    placing a mixing head into the container; and
    rotating the mixing head for a period of less than sixty seconds in order to form a fully hydrated frothed food product;
    wherein the mixing head comprises:
        an annular mixing blade, the annular mixing blade defining a central aperture; the annular mixing blade comprising a plurality of flat portions and a plurality of humps rising above the flat portions;
        a central hub disposed above the annular mixing blade; and
        a first strut and a second strut, the first and second strut connecting the annular mixing blade to the central hub.

2. The method of claim 1, wherein the dry food product mixture is added on top of the liquid.

3. The method of claim 1, wherein the dry food product mixture is a dry particulate mixture with 99% of particulates having a diameter of less than 210 microns.

4. The method of claim 1, wherein the hydrated food product includes at least about 10% air by volume.

5. The method of claim 1, wherein the hydrated food product achieves a Bostwick consistometer value of between 3 cm and 30 cm within less than 30 seconds of the beginning of rotation of the mixing head.

6. The method of claim 1, wherein at least 30 grams of the dry food product mixture is added into the container.

7. The method of claim 1, wherein the liquid is at least 165 degrees Fahrenheit.

* * * * *